United States Patent [15] 3,651,367
Yamamoto et al. [45] Mar. 21, 1972

[54] ELECTRICAL DISCHARGE TUBE

[72] Inventors: Manabu Yamamoto, Odawara-shi; Shunsuke Tomiyama; Susumu Saito, both of Tokyo-to, all of Japan

[73] Assignee: Kabushiki Kaisha Hitachi Seisakusho, Tokyo-to, Japan

[22] Filed: June 16, 1969

[21] Appl. No.: 833,345

[30] Foreign Application Priority Data

June 21, 1968 Japan.....................43/43288

[52] U.S. Cl..............................313/204, 313/220, 331/94.5
[51] Int. Cl........................................................H01j 17/22
[58] Field of Search..........................313/220, 204; 331/94.5

[56] References Cited

UNITED STATES PATENTS

| 3,437,950 | 4/1969 | Okaya et al. | 331/94.5 |
| 3,495,119 | 2/1970 | Kolb, Jr. | 313/220 X |
| 3,501,714 | 3/1970 | Myers et al. | 331/94.5 |
| 3,464,025 | 8/1969 | Bell | 331/94.5 |
| 3,517,333 | 6/1970 | Ashkin et al. | 331/94.5 |

Primary Examiner—Alfred L. Brody
Attorney—Robert E. Burns and Emmanuel J. Lobato

[57] ABSTRACT

A plurality of capillary discharge tubes are interconnected in serial alignment with orientations such that the mutually nearest electrodes of adjacent discharge tubes are of the same polarity to form a single long discharge tube to thereby eliminate cataphoresis or electrophoresis of the discharge gas occurring within this tube during gaseous discharging operation thereof.

7 Claims, 3 Drawing Figures

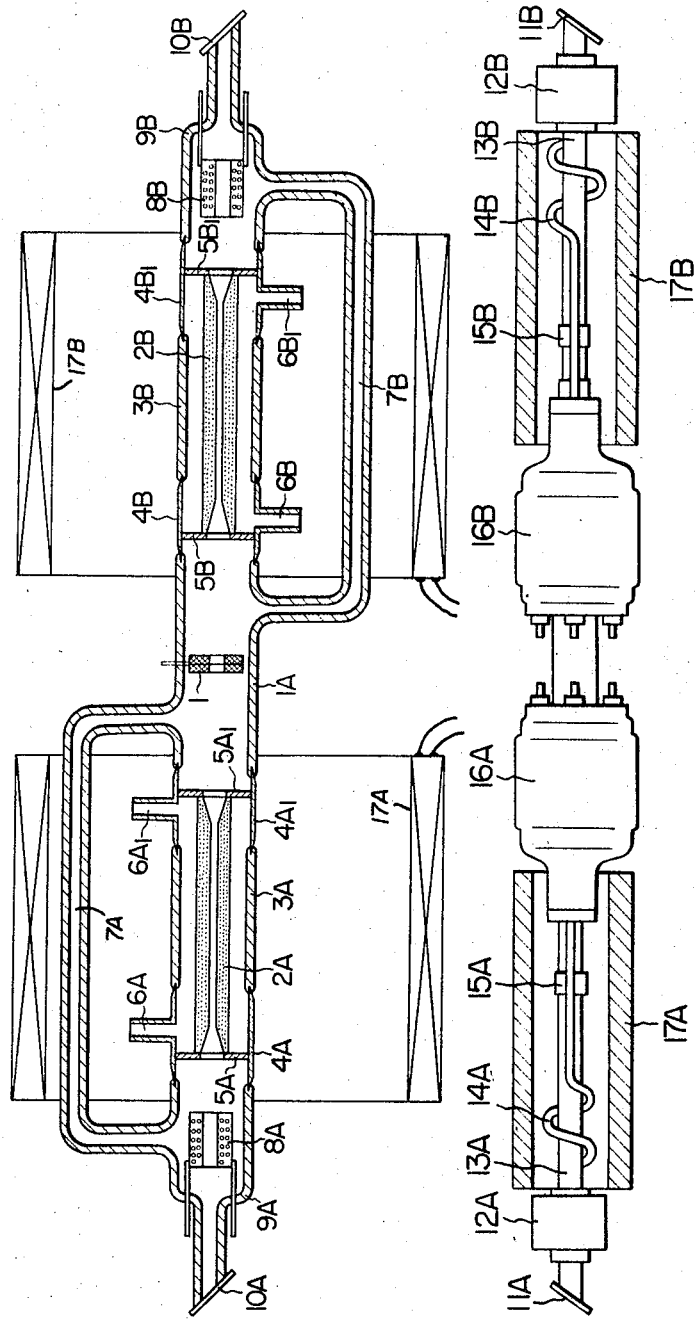

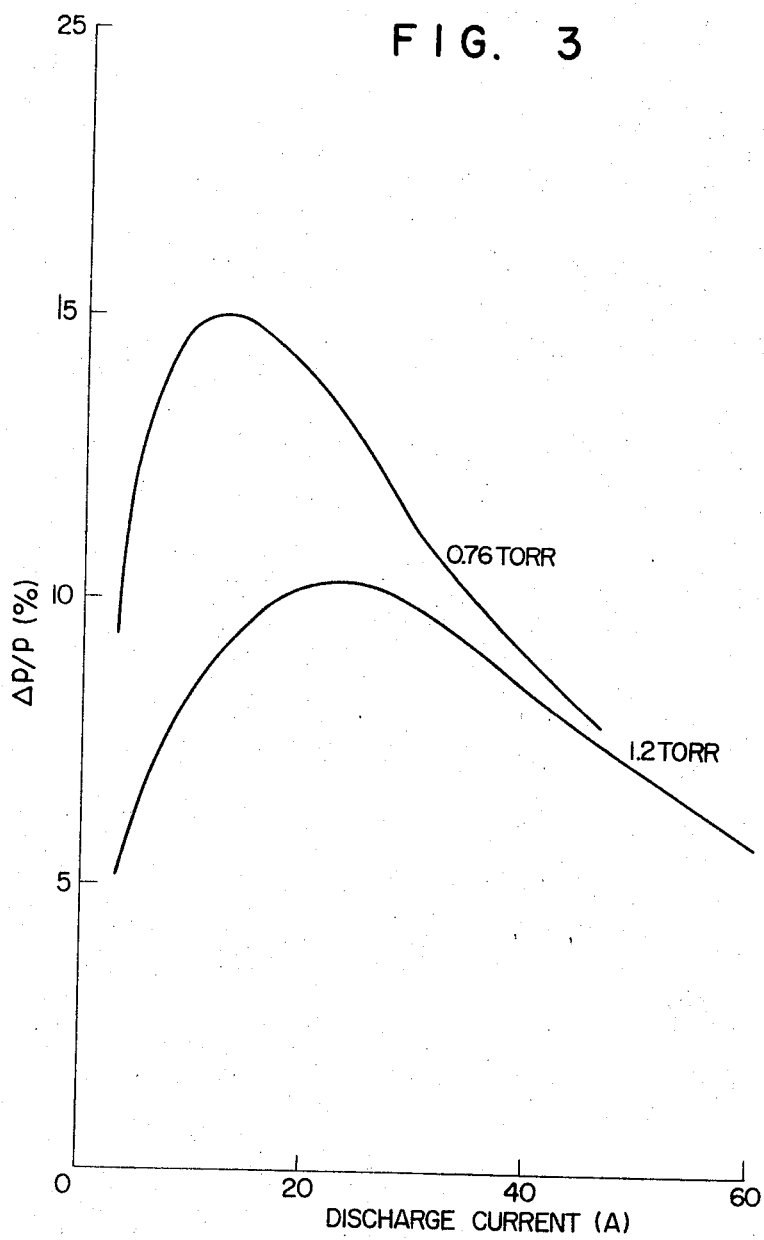

ELECTRICAL DISCHARGE TUBE

BACKGROUND OF THE INVENTION

This invention relates generally to electric discharge tubes and more particularly to a new gas discharge tube constituted by a plurality of thin capillary discharge tube.

In a so-called ion laser for generating spectral lines of ions of elements such as argon and krypton, it is ordinarily necessary to produce an electrical discharge of relatively high current in long and thin capillary discharge tubes. For example, to obtain a laser output power of the order of 10 w. with argon ion spectral lines, it is necessary to pass a discharge current of approximately 50 A. through a discharge tube of a bore of from 3 to 5 mm. and a length exceeding 60 cm. Under such condition of high current density, a gas pumping action due to electrical discharge commonly known as cataphoresis or electrophoresis occurs, and a pressure difference develops between the two ends of each capillary.

While the pressure with which a laser discharge tube is filled with gas is ordinarily of an optimum value determined by factors such as the tube dimensions and discharge current, it becomes impossible to maintain this optimum pressure over the entire length of the capillary when the abovementioned cataphoresis or electrophoresis occurs. Consequently, the laser output power drops, and, in extreme cases, the laser oscillation stops. Furthermore, when there are parts where the gas pressure is locally low, a pinch effect, that is a current constriction due to interaction between the current flowing through the capillary and a magnetic field established by this current, occurs, and the electrical discharge becomes unstable.

One measure which is effective to some extent in preventing electrophoresis of this nature is to connect communicatively the two ends of the capillary with another thin tube which is thereby used as a gas return path. However, while this method is effective in lowering the abovementioned difference between the pressure at the two ends of the capillary, this pressure difference cannot be totally eliminated, as indicated by the experimental results indicated in FIG. 3 of the accompanying drawing described hereinafter.

These results were obtained for the case, wherein a gas return path having inner diameter of 3 mm. and length of 800 mm. was connected to a capillary discharge tube having inner diameter of 4 mm. and length of 400 mm. The abscissa represents discharge current, while the ordinate represents the ratio $\Delta p/p$ of the pressure difference $\Delta p$ between the two ends of the discharge tube and the gas filling pressure $p$. The gas used was krypton, and the variation of the ratio $\Delta p/p$ with discharge current was measured for filling pressures of 0.76 torr and 1.2 torr.

As a result of similar experiments with varied length of the discharge tube, it was found that the pressure difference increases with increased discharge tube length.

Another phenomenon which is a technical difficulty peculiar to ion lasers is a lowering of the light output caused by contamination of the inner surfaces of the discharge tube windows through which the laser light is projected out, this contamination being due to sputtering of the cathode. This optical degradation of windows is considered to be an obstructive difficulty in the practical use of high-power ion lasers.

SUMMARY OF THE INVENTION

It is an object of the present invention to overcome the above described difficulties in ion lasers by preventing the occurrence of cataphoresis or electrophoresis in capillary discharge tubes.

Another object of the invention is to provide a discharge tube of a construction such that contamination of the light projection window of an ion laser due to cathode sputtering during direct-current discharge is remarkably reduced.

The above objects have been achieved by the present invention, the principle of which resides in the connection of at least two capillary discharge tubes in an arrangement such that, at the discharge tube ends, the mutually nearest electrodes of mutually adjacent tubes are of the same polarity, whereby there is constituted a single long discharge tube.

While the pressure difference which arises because of electrophoresis increases with the length of the tube, in a tube made up of a plurality of discharge tubes connected in the above described manner, the maximum pressure difference which occurs over the entire length of the tube is determined by the distance between the electrodes. Accordingly, a substantial improvement over known discharge tubes of like nature has been obtained.

The principal advantageous features of the discharge tube according to the invention are as follows.

1. By lessening or minimizing the development of a pressure difference due to electrophoresis an appropriate pressure can be maintained over the entire length of the discharge tube, and it becomes possible to increase laser output and oscillation efficiency.

2. While it is difficult to fabricate a long article from a single piece of a ceramic material such as beryllia because of the low mechanical strength of ceramics, and, moreover, while ceramic materials are easily affected by thermal strain, the fabrication of such an article is facilitated by providing one or more connections at one or more intermediate points thereof.

3. While the dimensional accuracy of ceramics, in general, is poor, it is possible to compensate for bends and warps by using an intermediate connection.

According to the present invention, briefly summarized, there is provided an electrical discharge tube consisting, essentially, of two or more component capillary discharge tubes interconnected in serial alignment with orientations such that the mutually nearest electrodes of adjacent discharge tubes are of the same polarity to form a single elongated discharge tube, the capillaries of the elemental discharge tubes containing a discharge gas maintained, at a specific pressure and filling an elongated gastight envelope which contains the capillaries and is provided at the ends thereof with light-transmitting windows.

The nature, principle, details, and utility of the invention will be more apparent from the following detailed description with respect to preferred embodiments of the invention when read in conjunction with the accompanying drawing.

BRIEF DESCRIPTION OF THE DRAWING

In the drawing:

FIG. 1 is a side view in longitudinal section, showing the essential organization of one example of a discharge tube according to the invention;

FIG. 2 is a side view, partly in longitudinal section, showing another embodiment of the invention; and FIG. 3 is a graphical representation indicating pressure difference characteristics due to electrophoresis in direct-current discharge.

DETAILED DESCRIPTION OF THE PREFERRED EMBODIMENTS

In one example of the invention, the discharge tube has an organization in which, essentially, two capillary discharge tubes are butt-joined symmetrically on opposite sides of a common annular anode 1 constituting a central member as illustrated in FIG. 1.

The two capillary discharge tubes respectively have coaxial capillaries 2A and 2B made of beryllia and having an inner diameter of 3 mm., an outer diameter of 10 mm., and a length of 400 mm. These capillaries 2A and 2B are supported at their ends by thin end plates 5A, 5A$_1$ and 5B, 5B$_1$ made of oxygen-free copper or nickel and supported transversely in connecting rings 4A, 4A$_1$, and 4B, 4B$_1$ made of Kovar. The capillaries 2A and 2B are concentrically surrounded by cooling water jackets 3A and 3B made of electrical insulator material and fixed at their ends to the connection rings 4A, 4A$_1$ and 4B, 4B$_1$. The end plates 5A, 5A$_1$ and 5B, 5B$_1$ are made flexible so as to prevent mechanical or thermal stresses from being applied to the beryllia capillaries, which are of low strength.

Thus, the end plates, connecting rings, water jacket, and capillary in each capillary discharge tube (for example, end plates 5A and 5A$_1$, connecting rings 4A and 4A$_1$, water jacket 3A, and capillary 2A in the tube on the left-hand side as viewed in FIG. 1) define an annular or tubular cooling-water chamber around the capillary. These chambers in the two tubes are provided with cooling-water pipe fittings 6A, 6A$_1$ and 6B, 6B$_1$ for circulation of cooling water.

The inner ends of the inner connecting rings 4A$_1$ and 4B are communicatively connected by a coaxial tube 1A interposed therebetween and containing the aforementioned common anode 1 at its middle part. The outer ends of the outer connection rings 4A and 4B$_1$ are communicatively connected to the base ends of glass cathode bulbs 9A and 9B respectively containing and supporting annular cathodes 8A and 8B and provided at their outer extremities with Brewster windows 10A and 10B.

Central holes are provided in each of the end plates 5A, 5A$_1$, 5B, and 5B$_1$ to afford communication of the interior of each capillary with the interiors of the corresponding cathode bulb and the middle tube 1A. The interior of the middle tube 1A on each side of the common anode 1 is further connected communicatively to the interior of the cathode bulb on that side by a gas-return bypath 7A or 7B.

When the above described discharge tube is used in actual practice as a laser source, a magnetic field is impressed in the capillary axis direction by providing a magnetic coil 17A and 17B wound around the discharge tube and passing current through this coil.

Furthermore, while two capillary discharge tubes are used in tandem arrangement in the above described example of the invention, it is also possible to connect three or more discharge tubes in a multistage arrangement.

In another embodiment of the invention as illustrated in FIG. 2, cathodes 16A and 16B constitute the intermediate connection between two capillary discharge tubes, and two anodes 12A and 12B are disposed at the outer end parts of these discharge tubes, which are identical in construction and are symmetrically disposed in coaxial cathode-to-cathode connection. The outer extremities of the discharge tubes are provided with Brewster windows 11A and 11B.

The capillary part of each of these two discharge tubes is disposed between the cathode 16A (or 16B) and the anode 12A (or 12B) and is provided with a cooling water jacket 13A (or 13B) made of a metal, a ceramic ring 15A (or 15B), a gas-return bypath 14A (or 14B) interconnecting and providing communication between the anode and cathode sides, and a solenoid 17A (or 17B) for impressing a magnetic field on the capillary, that is, a coil wound around the capillary.

While two discharge tubes are used in the above described example, equally effective results can be achieved by interconnecting an even whole number multiple of similar discharge tubes with their cathodes in the middle positions.

A discharge tube organization as described above has the following advantageous features.

1. Substances which have been scattered by evaporation or by sputtering from the hot cathode during discharge and are suspended in the tube gas tend to adhere to the inner surface of each Brewster window, giving rise to a lowering of the light output. Therefore, an arrangement in which the Brewster windows are remotely separated from their corresponding cathode, as in the above described example, is advantageous.

2. While a coil is ordinarily wound around each capillary part as described above, it will be apparent that a convenient laser assembly process comprises fabricating each discharge tube and solenoid separately and then inserting the discharge tube into the solenoid. Then, since a water-cooled anode, in general, can be considerably miniaturized, and the outer diameter thereof can be made smaller than that of a cathode bulb, the positioning of the anodes at the outer ends of the discharge tubes is more advantageous from the viewpoint of the assembling process and miniaturization of the solenoid.

The discharge tubes of the above described two examples are suitable for use in argon or krypton ion laser. The particulars and result of one instance of actual practice wherein a discharge tube according to the invention was used as a krypton ion laser generator oscillating at Kr$^+$ 6,471 A. were as follows.

| | |
|---|---|
| Krypton filling pressure: | 1.6 Torr |
| Discharge current: | 50 A. |
| Voltage between electrodes: | 270 volts |
| Coupling of optical resonator: | 2% |
| Magnetic field strength: | 300 gauss |
| Laser output: | 4 w. |

We claim:

1. An electrical discharge tube assembly comprising: a plurality of capillary discharge tubes each having opposed ends; means connecting together said capillary discharge tubes in end-to-end coaxial relationship and defining a fluidtight enclosure; an electrode disposed within said enclosure in coaxially spaced-apart relationship from an end of each capillary discharge tube; a discharge gas disposed within said enclosure at a predetermined pressure; means for applying during operation of the tube assembly an electric potential across respective pairs of said electrodes disposed at opposite ends of each said capillary discharge tube to effect gaseous discharge of said discharge gas under varying pressure conditions; cooling means positioned around each said capillary discharge tube for cooling same; and conduit means providing fluid communication between opposite ends of each said capillary discharge tube for effectively minimizing pressure differences within said discharge gas during a gaseous discharge.

2. An electrical discharge tube assembly according to claim 1; wherein said cooling means comprises an annular jacket surrounding each said capillary discharge tube having means therein defining inlet and outlet ports for effecting circulation of a cooling medium through said annular jacket.

3. An electrical discharge tube assembly according to claim 1; wherein said conduit means comprises a helical conduit disposed around each said capillary discharge tube, and means providing fluid communication between each said helical conduit and said enclosure at locations adjacent opposite ends of respective ones of said capillary discharge tubes.

4. An electrical discharge tube assembly according to claim 1; wherein said plurality of capillary discharge tubes comprises an even whole number multiple of capillary discharge tubes.

5. An electrical discharge tube assembly according to claim 1; including magnetic field generating means for generating a magnetic field extending in the axial direction of each said capillary discharge tube.

6. An electrical discharge tube assembly according to claim 1; wherein each said electrode comprises an annular electrode having means therein defining a central opening, and means mounting each said annular electrode within said enclosure in coaxially spaced-apart relationship.

7. An electrical discharge tube comprising: a gastight outer tube having light-transmitting windows provided at two opposed ends thereof and an even number of capillary discharge tubes serially disposed in spaced-apart coaxial alignment with each other and with said light-transmitting windows, said capillary discharge tubes having opposed ends and constituting a part of said gastight outer tube; cooling means positioned around each said capillary discharge tube for cooling same; an electrode provided at both said opposed ends of each said capillary discharge tube within said gastight outer tube; a discharge gas sealed within said gastight outer tube at a predetermined pressure; means for impressing a magnetic field in an axial direction of each said capillary discharge tube; a direct current power source connected to said electrodes for applying electric energy between the electrodes positioned at said opposed ends of each said capillary discharge tube in such a manner that the mutually adjacent electrodes of mutually adjacent capillary discharge tubes are of the same polarity during application of said magnetic field to thereby effect gaseous discharge of said discharge gas in said capillary discharge tubes; and a gas return bypath interconnecting and providing communication between the two opposed ends of each said capillary discharge tube to effectively minimize pressure differences within said discharge gas during the gaseous discharge.

* * * * *